United States Patent [19]

Sugano

[11] Patent Number: 4,793,215

[45] Date of Patent: Dec. 27, 1988

[54] TRANSMISSION

[75] Inventor: Kazuhiko Sugano, Yokohama, Japan

[73] Assignee: Nissan Motor Company, Limited, Yokohama, Japan

[21] Appl. No.: 885,136

[22] Filed: Jul. 14, 1986

[30] Foreign Application Priority Data

Aug. 6, 1985 [JP] Japan ................................ 60-171866

[51] Int. Cl.⁴ ............................................. F16H 57/10
[52] U.S. Cl. ........................................ 74/758; 74/753
[58] Field of Search ................. 74/753, 758, 759, 762, 74/763

[56] References Cited

U.S. PATENT DOCUMENTS

| | | | |
|---|---|---|---|
| 2,764,904 | 10/1956 | Kummica | 74/763 |
| 3,339,431 | 9/1967 | Croswhite et al. | 74/763 X |
| 3,473,415 | 10/1969 | Kepner | 74/759 |
| 4,331,044 | 5/1982 | Bookout et al. | 74/762 X |
| 4,368,649 | 1/1983 | Vahratian et al. | 74/758 X |
| 4,455,890 | 6/1984 | Kuramochi et al. | 74/763 X |
| 4,509,389 | 4/1985 | Vahratian et al. | 74/759 X |
| 4,638,688 | 1/1987 | Hiraiwa | 74/753 |
| 4,653,348 | 3/1987 | Hiraiwa | 74/759 |
| 4,660,439 | 4/1987 | Hiraiwa | 74/762 X |

FOREIGN PATENT DOCUMENTS

| | | | |
|---|---|---|---|
| 0143350 | 6/1985 | European Pat. Off. | 74/763 |
| 2035479 | 6/1980 | United Kingdom | 74/763 |

OTHER PUBLICATIONS

General Motors Corporation, H 700-R4-195-7/83, p. 68, "Complete Hydraulic Oil Circuits".

Primary Examiner—Leslie A. Braun
Assistant Examiner—David Novais
Attorney, Agent, or Firm—Foley & Lardner, Schwartz, Jeffery, Schwaab, Mack, Blumenthal & Evans

[57] ABSTRACT

A transmission comprises two planetary gear sets which are interconnected to provide four forward speeds and one reverse between an input shaft and an output shaft, and friction elements arranged to cause the two planetary gear sets to provide any one of the four forward speeds. The friction elements include a clutch and a one-way clutch arranged in series with the clutch.

4 Claims, 6 Drawing Sheets

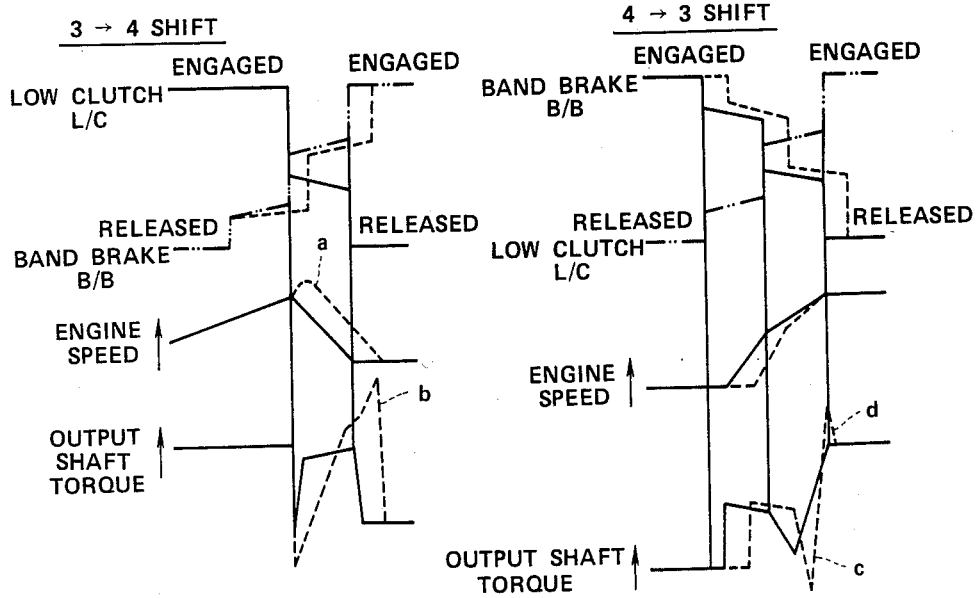
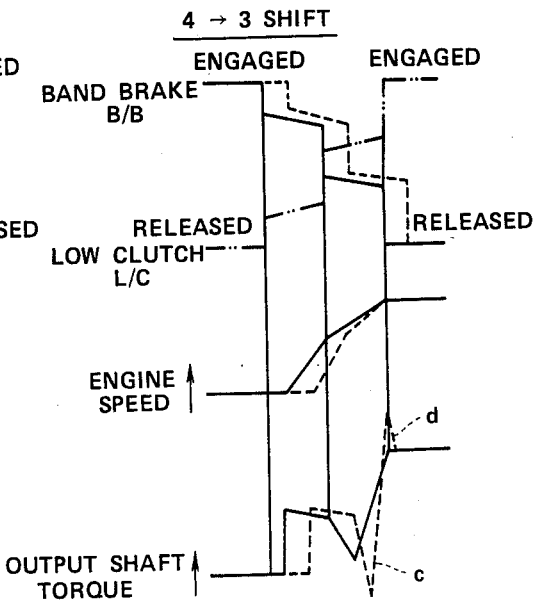
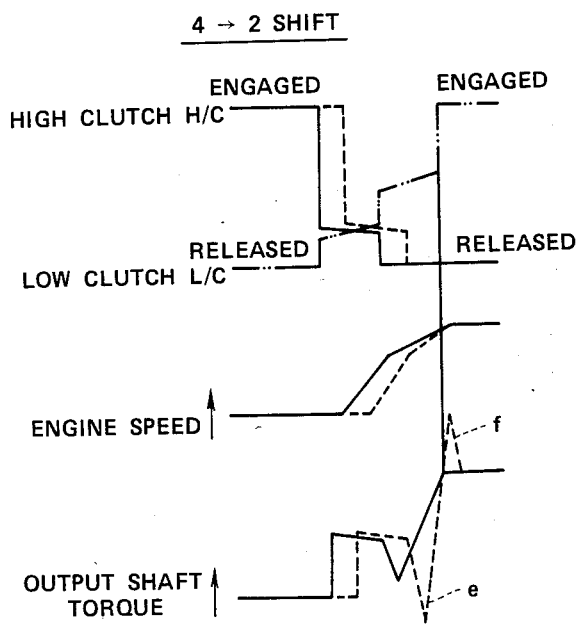

FIG. 6
*PRIOR ART*

| RANGE | FRICTION ELEMENT / SPEED | L/C | H/C | R/C | B/B | LR/B | LO/C |
|---|---|---|---|---|---|---|---|
| D | 1 SPEED | ○ | × | × | × | × | ○ |
| D | 2 SPEED | ○ | × | × | ○ | × | × |
| D | 3 SPEED | ○ | ○ | × | × | × | × |
| D | 4 SPEED | × | ○ | × | ○ | × | × |
| III | 1 SPEED | ○ | × | × | × | × | ○ |
| III | 2 SPEED | ○ | × | × | ○ | × | × |
| III | 3 SPEED | ○ | ○ | × | × | × | × |
| II | 1 SPEED | ○ | × | × | × | × | ○ |
| II | 2 SPEED | ○ | × | × | ○ | × | × |
| I | 1 SPEED | ○ | × | × | × | ○ | × |
| R | REV. | × | × | ○ | × | ○ | × |
| P, N | | × | × | × | × | × | × |

FIG. 7

| RANGE | FRICTION ELEMENT SPEED | F/C | H/C | R/C | OR/C | B/B | LR/B | FO/C | LO/C |
|---|---|---|---|---|---|---|---|---|---|
| D | 1 SPEED | ○ | × | × | × | × | × | ○ | ○ |
| D | 2 SPEED | ○ | × | × | × | ○ | × | ○ | × |
| D | 3 SPEED | ○ | ○ | × | × | × | × | ○ | × |
| D | 4 SPEED | ○ | ○ | × | × | ○ | × | × | × |
| III | 1 SPEED | ○ | × | × | ○ | × | × | × | × |
| III | 2 SPEED | ○ | × | × | ○ | ○ | × | × | × |
| III | 3 SPEED | ○ | ○ | × | ○ | × | × | × | × |
| II | 1 SPEED | ○ | × | × | ○ | × | × | × | × |
| II | 2 SPEED | ○ | × | × | ○ | ○ | × | × | × |
| I | 1 SPEED | ○ | × | × | ○ | × | ○ | × | × |
| R | REV. | × | × | ○ | × | × | ○ | × | × |
| P, N | | × | × | × | × | × | × | × | × |

TRANSMISSION

BACKGROUND OF THE INVENTION

The present invention relates to a transmission.

There has been proposed by General Motors Corporation in the United States a THM 700 type transmission which includes two planetary gear sets to provide four speeds. In this known transmission, there exists a member which will rotate at a speed higher than an allowable level during operation. Thus, poor durability of this member and its associated bearing structure is unavoidable.

The assignee of the present application has developed a transmission as shown in FIG. 5. This known transmission is described in "RN4F02A type, RL4F02A type automatic transaxle service manual" (A261C06). It does not have such a rotary member which rotates at a speed higher than an allowable level.

Referring to FIG. 5, the above mentioned known transmission comprises an input shaft 1, an output shaft 2, a front planetary gear set 3, and a rear planetary gear set 4. Rear planetary gear set 4 is arranged between output shaft 2 and front planetary gear set 3. A sun gear 3S of front planetary gear set 3 is adapted to be anchored by a band brake B/B and it is connectable via a reverse clutch R/C to input shaft 1. A carrier 3C rotatably supporting pinions 3P is connectable via a high clutch H/C to input shaft 1, and is operatively associated with a low one-way clutch LO/C which is arranged to prevent the carrier from rotating in the reverse or in the opposite direction to forward rotation of input shaft 1. It is adapted to be anchored by a low & reverse brake LR/B, and it is connectable via a low clutch L/C to a ring gear 4R of rear planetary gear set 4. Rear planetary gear set 4 has a carrier 4C connected to a ring gear 3R of front planetary gear set 3 and also to output shaft, and it has its sun gear 4S connected to input shaft 1.

With the known transmission, there are established four forward speeds and one reverse by activating a selected combination of friction elements in the pattern shown in the accompanying table illustrated in FIG. 6. In FIG. 6, friction elements which are activated are denoted by the reference character o, while friction elements which are not activated are denoted by x. III range designates a state in D range where establishment of an overdrive (OD) or 4th speed is prohibited.

In this transmission, low clutch L/C must be deactivated or released to interrupt the drive connection between carrier 3C and ring gear 4R in shifting to 4th speed (overdrive). Thus, in addition to activation or release of low clutch L/C, another friction element must be activated or released during a shift to 4th speed or during a shift from 4th speed. Thus, one of the two friction elements has to be activated in good timed relationship with release of the other in order to prevent the engine from racing and to prevent the transmission from interlocking.

Shift from 3rd speed to 4th speed is effected by release of low clutch L/C and engagement of band brake B/B. If band brake B/B is engaged in good timed relationship with release of low clutch L/C as indicated by phantom line and fully drawn line in FIG. 3(a), no substantial shocks take place during the shift as will be appreciated from variation in engine speed and variation in transmission output shaft torque which are illustrated by fully drawn lines. If the engagement timing of band brake B/B is delayed as illustrated by broken line in FIG. 3(a), the engine races as illustrated by broken line designated by the reference numeral a. The inertia of rotation caused by this engine racing results in a peak torque, in transmission output shaft torque, illustrated by broken line designated by the reference numeral b upon engagement of band brake B/B.

Shift from 4th speed to 3rd speed is effected by engagement of low clutch L/C and release of band brake B/B. If low clutch L/C is engaged in good timed relationship with release of band brake B/B as illustrated in phantom line and fully drawn line in FIG. 3(b), no substantial shocks take place during the shift as will be appreciated from variation in engine speed and variation in transmission output shaft torque which are illustrated by fully drawn lines. If the release timing of band brake B/B is delayed as illustrated by broken line in FIG. 3(b), there occurs temporal interlock in the transmission which causes engine speed to vary as illustrated by the broken line. This variation in engine speed causes a drop c in transmission output shaft torque and subsequent peak d in transmission output torque due to reaction of the drop c. This peak d causes substantial shocks during the shift.

Shift from 4th speed to 2nd speed is effected by engagement of low clutch L/C and release of high clutch B/C. If low clutch L/C is engaged in good timed relationship with release of high clutch H/C as illustrated by phantom line and fully drawn line in FIG. 3(c), no substantial shocks take place during the shift as will be appreciated from variation in engine speed and variation in transmission output shaft torque which are illustrated by fully drawn lines in FIG. 3(c). If the release timing of high clutch H/C is delayed as illustrated by broken line in FIG. 3(c), there occurs temporal interlock in the transmission which causes engine speed to vary as illustrated by broken line. This variation in engine speed causes a drop e in transmission output shaft torque and subsequent peak f in transmission output shaft torque due to reaction caused by the drop e. This peak f causes substantial shocks during the shift.

For alleviating shocks during shifting operation, it has therefore been necessary to effect precision control of timing of change and rate of change of hydraulic fluid pressure which is used to effect engagement/release of low clutch L/C and release/engagement of friction element which is to shift in timed relationship with the action of low clutch L/C.

An object of the present invention is to provide a transmission which is free from the above mentioned problems.

SUMMARY OF THE INVENTION

According to the present invention, in order to provide a drive connection between a carrier of a front planetary gear set and a ring gear of a rear planetary gear set, a forward clutch and a forward one-way clutch are arranged in series such that the forward one-way clutch transmits forward rotation from the carrier of the front planetary gear set to the ring gear of the rear planetary gear set.

In this transmission, with the forward clutch kept engaged, a shift to any one of 1st to 4th speeds is effected by activating a selected one of the other friction elements. The forward one-way clutch interrupts transmission of torque to separate the ring gear of the rear planetary gear set from the carrier of the front planetary gear set which is necessary to establish 4th speed.

BRIEF DESCRIPTION OF THE DRAWINGS

FIG. 3(a) is an operation time chart for a shift from 3rd to 4th speed taking place in the previously discussed known transmission shown in FIG. 5;

FIG. 3(b) is an operation time chart for a shift from 4th to 3rd speed taking place in the known transmission shown in FIG. 5;

FIG. 3(c) is an operation time chart for a shift from 4th to 3rd speed taking place in the known transmission shown in FIG. 5;

FIG. 6 shows a table illustrating the pattern of engagement and disengagement of the various friction elements in different speeds of the known transmission shown in FIG. 5; and FIG. 7 shows a table illustrating the pattern of engagement and disengagement of the various friction elements in different speeds of the transmission according to the present invention shown in FIG. 1.

DESCRIPTION OF THE PREFERRED EMBODIMENTS

Figure 1:
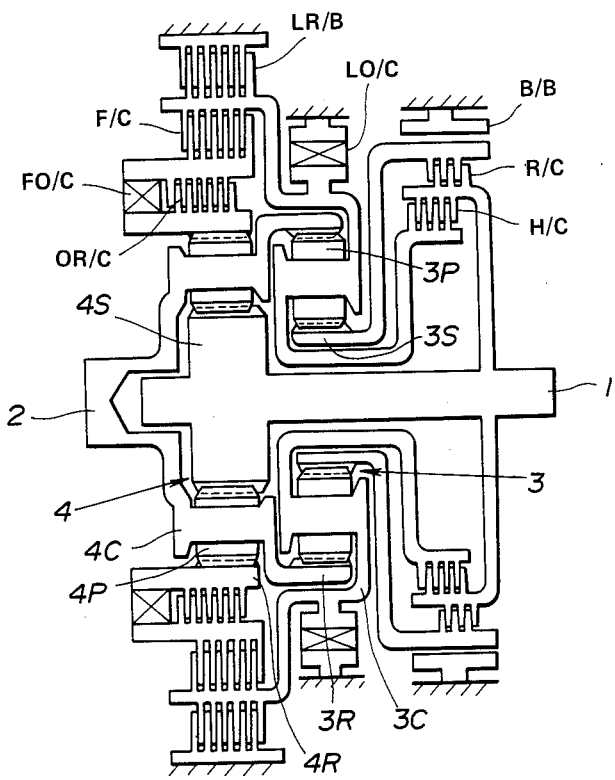
FIG. 1 is a schematic view of a transmission according to the present invention.
Figure 5:
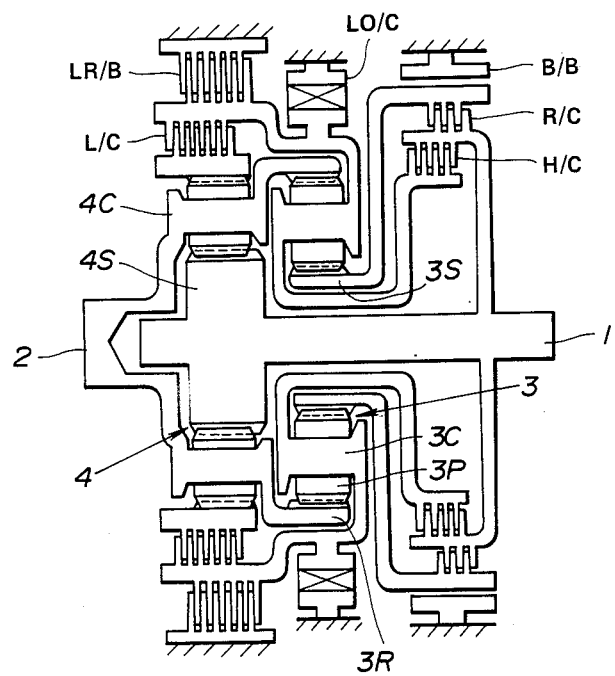
FIG. 5 is a schematic view of the previously discussed known transmission.

Referring to FIG. 1, the transmission illustrated herein is substantially the same as the previously discussed transmission illustrated in FIG. 5 except the provision of a forward clutch F/C and a forward one-way clutch FO/C. Like reference characters and numerals are used in FIGS. 1 and 5 to designate like parts. More specifically, forward clutch F/C and forward one-way clutch FO/C are arranged in series between carrier 3C of front planetary gear set 3 and ring gear 4R of rear planetary gear set 4. Forward one-way clutch FO/C is arranged such that only forward torque, i.e., a torque with the same direction as input torque on input shaft 1, is transmitted from front carrier 3C to rear ring gear 4R. Thus, rear ring gear 4R is permitted by forward one-way clutch FO/C to rotate in the forward direction at a speed higher than front carrier 3C.

Forward one-way clutch FO/C is released when it is subject to reverse torque input from output shaft 2 in order to interrupt transmission of the reverse torque. An overrunning clutch OR/C is arranged in parallel to forward one-way clutch FO/C. Overrunning clutch OR/C is engaged when engine brake is demanded. Engagement of overrunning clutch OR/C renders forward one-way clutch FO/C inoperable.

With this transmission, there are established four forward speeds and one reverse by activating a selected combination of friction elements in the pattern as shown in the accompanying table of FIG. 7. In FIG. 7, friction elements which are activated are denoted by the reference character o, while friction elements which are not activated are denoted by x. III range designates a state in D range where establishment of an overdrive (OD) or 4th speed is prohibited.

With this transmission, since with forward clutch F/C is kept engaged, ring gear 4R can be out of drive connection with front carrier 3C by forward one-way clutch FO/C to establish 4th speed, any shift up to 4th speed and any shift down from 4th speed can be effected by engagement or release of a single friction element as will be readily understood from FIG. 7. Thus, even if the timing of engagement or release of the shifting friction element is delayed, the engine will not race or the transmission will not interlock. As a result, no substantial shocks take place during any shift up to 4th speed and during any shift down from 4th speed as will be readily understood from the following description.

Figure 2A:
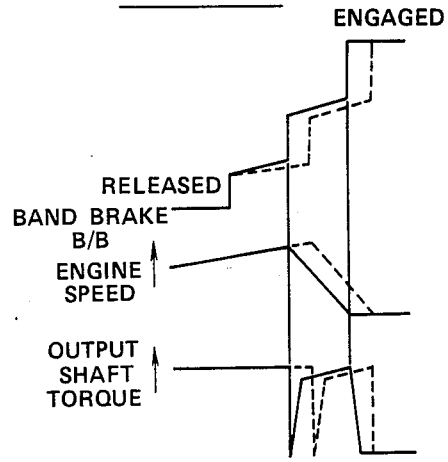
FIG. 2(a) is an operation time chart for a shift from 3rd to 4th speed taking place in the transmission shown in FIG. 1.

A shift from 3rd speed to 4th speed is effected by engagement of band brake B/B only as illustrated by the fully drawn line in FIG. 2(a). During this shift, engine speed and transmission output shaft torque vary as illustrated by the fully drawn lines in FIG. 2(a). Even if the engagement timing of band brake B/B is delayed as illustrated by the broken line, since the transmission does not enter neutral, the engine will not race during this shift. This only results in a delay in occurrence of a drop in engine speed and a delay in the occurrence of a drop in transmission output shaft torque without causing any substantial change in their variation patterns as illustrated by the broken line in FIG. 2(a). No substantial shocks are therefore caused during the shift from 3rd to 4th speed.

Figure 2B:
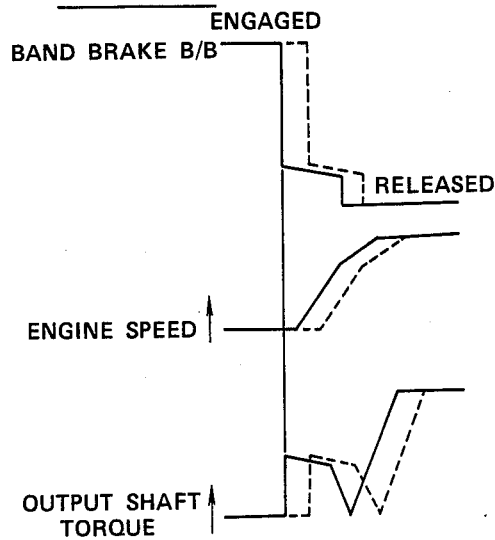
FIG. 2(b) is an operation time chart for a shift from 4th to 3rd speed taking place in the transmission shown in FIG. 1.

Shift from 4th to 3rd speed is effected by release of band brake B/B as illustrated by the fully drawn line in FIG. 2(b). During this shift, engine speed and transmission output shaft torque vary as shown by the fully drawn line in FIG. 2(b). Even if the release timing of band brake B/B is delayed as illustrated by broken line, since the transmission will not interlock, no substantial drop in transmission output shaft torque will take place. This only results in a delay in occurrence of rise in engine speed and a delay in occurrence of rise in transmission output shaft torque without causing any substantial change in their variation patterns as illustrated by broken line in FIG. 2(b). No substantial shocks are therefore caused during the shift from 4th to 3rd speed.

Figure 2C:
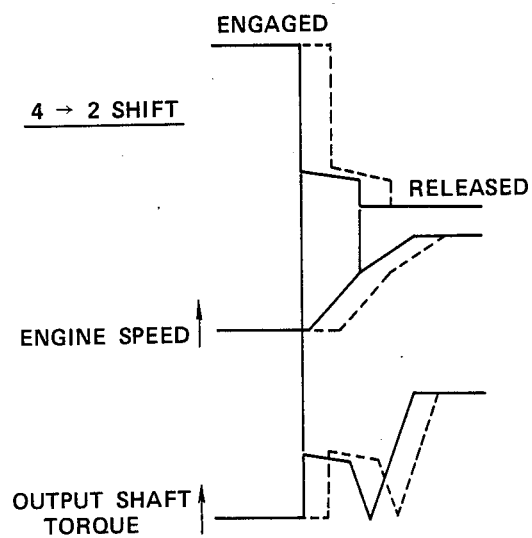
FIG. 2(c) is an operation time chart for a shift from 4th to 3rd speed taking place in the transmission shown in FIG. 1.

Shift from 4th to 2nd speed is effected by release of high clutch H/C as illustrated by fully drawn line in FIG. 2(c). During this shift engine speed and transmission output shaft torque vary as shown by broken line in FIG. 2(c). Even if the release timing of high clutch H/C is delayed as illustrated by broken line, since the transmission does not interlock, no substantial drop in transmission output shaft torque will take place. This only results in a delay in occurrence of rise in engine speed and a delay in occurrence of rise in transmission output shaft torque without causing any substantial change in their variation patterns as illustrated by broken line in FIG. 2(c). No substantial shocks are therefore caused during the shift from 4th to 2nd speed.

Figure 4:
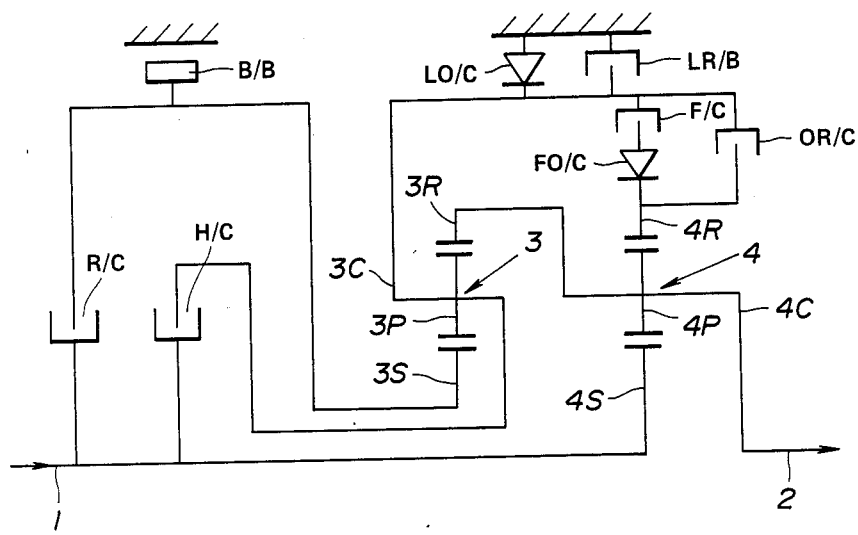
FIG. 4 is a schematic view of a second embodiment of a transmission according to the present invention.

Referring to FIG. 4, the second embodiment herein illustrated is substantially the same as the first embodiment except the arrangement of an overrunning clutch OR/C. In this embodiment, the location of overrunning clutch OR/C is replaced with the location of forward one-way clutch FO/C and the overrunning clutch OR/C is arranged in parallel not only to forward one-way clutch FO/C but also to forward clutch F/C in such a manner as to selectively connect front carrier 3C to rear ring gear 4R.

What is claimed is:

1. A transmission comprising:
an input shaft;
an output shaft;
a first planetary gear set including a first sun gear selectively connectable by a first clutch to said input shaft, a first carrier selectively connectable by a second clutch to said input shaft, and a first ring gear connected to said output shaft, said first sun gear being selectively held stationary by a first brake, said first carrier being allowed to rotate in the same forward direction as said input shaft when said second clutch is engaged, but prevented from rotating in a reverse direction opposite to said forward direction by a first one-way clutch, said first carrier being selectively held stationary by a second brake;
a second planetary gear set including a second sun gear connected to said input shaft, a second carrier connected to said first ring gear and also to said output shaft, and a second ring gear;
means for drivingly connecting said first carrier to said second ring gear in such a manner as to allow overrunning of said second ring gear relative to said first carrier, said drivingly connecting means includes a third clutch and a second one-way clutch which is connected in series with said third clutch, said second one-way clutch being arranged to allow transmission of forward rotation from said first carrier to said second ring gear and to allow overrunning of said second ring gear relative to said first carrier when said third clutch is engaged.

2. A transmission as claimed in claim 1, wherein said first planetary gear set is disposed between said input shaft and said output shaft, and said second planetary gear set is disposed between said first planetary gear set and said output shaft.

3. A transmission as claimed in claim 1, wherein said drivingly connecting means also includes a fourth clutch arranged in parallel to said second one-way clutch.

4. A transmission as claimed in claim 1, wherein said drivingly connecting means includes a fourth clutch arranged in parallel not only to said second one-way clutch but also to said third clutch.

* * * * *